(12) United States Patent
Andersen et al.

(10) Patent No.: US 8,915,483 B2
(45) Date of Patent: Dec. 23, 2014

(54) VALVE WITH A VALVE BONNET

(75) Inventors: Jens Christian Folkmar Andersen, Fredericia (DK); Karsten Schack Madsen, Odense (DK); Louise Wichmann Agner, Broerup (DK)

(73) Assignee: Alfa Laval Corporate AB, Lund (SE)

( * ) Notice: Subject to any disclaimer, the term of this patent is extended or adjusted under 35 U.S.C. 154(b) by 79 days.

(21) Appl. No.: 13/704,539

(22) PCT Filed: Jun. 15, 2011

(86) PCT No.: PCT/EP2011/059958
§ 371 (c)(1),
(2), (4) Date: Feb. 7, 2013

(87) PCT Pub. No.: WO2011/157760
PCT Pub. Date: Dec. 22, 2011

(65) Prior Publication Data
US 2013/0134345 A1    May 30, 2013

(30) Foreign Application Priority Data

Jun. 15, 2010   (DK) .................................. 2010 70264

(51) Int. Cl.
| F16K 31/44 | (2006.01) |
| F16K 31/00 | (2006.01) |
| F16J 15/00 | (2006.01) |
| F16K 41/04 | (2006.01) |
| F16K 1/36 | (2006.01) |
| F16K 5/00 | (2006.01) |
| F16K 31/122 | (2006.01) |
| F16K 27/02 | (2006.01) |

(52) U.S. Cl.
CPC . *F16K 5/00* (2013.01); *F16K 41/04* (2013.01); *F16K 1/36* (2013.01); *F16K 31/122* (2013.01); *F16K 27/02* (2013.01)
USPC ............................. 251/214; 251/355; 277/500

(58) Field of Classification Search
USPC ................... 251/355, 214; 277/500, 630, 637
See application file for complete search history.

(56) References Cited

U.S. PATENT DOCUMENTS

| 2,583,291 | A | | 1/1952 | Beem | |
| 3,043,555 | A | * | 7/1962 | Breher | .......................... 251/187 |

(Continued)

FOREIGN PATENT DOCUMENTS

| CN | 1328221 A | 12/2001 |
| CN | 201215185 Y | 4/2009 |

(Continued)

OTHER PUBLICATIONS

Chinese Office Action (PCT application entering into the national phase) dated Sep. 22, 2013, issued by the State Intellectual Property Office of People's Republic of China in corresponding Chinese Patent Application No. 201180029584.X, and English language translation of Office Action. (17 pages).

(Continued)

*Primary Examiner* — John K Fristoe, Jr.
*Assistant Examiner* — Michael R Reid
(74) *Attorney, Agent, or Firm* — Buchanan Ingersoll & Rooney PC

(57) ABSTRACT

A valve comprising a valve housing with a valve bonnet, an inlet opening and an outlet opening, the valve bonnet having a passage for a valve stem, the passage having a sidewall and the valve stem comprising a valve disk for closing the valve by bringing the valve disk in contact with a valve seat in the valve housing, the passage in the valve bonnet comprising at least a first section with a first cross sectional area and a second section with a second cross sectional area that is smaller than the first cross sectional area. The sidewall in the passage is in direct contact with the valve stem at the second section with the second cross sectional area.

12 Claims, 4 Drawing Sheets

(56) References Cited

U.S. PATENT DOCUMENTS

Figure 1:
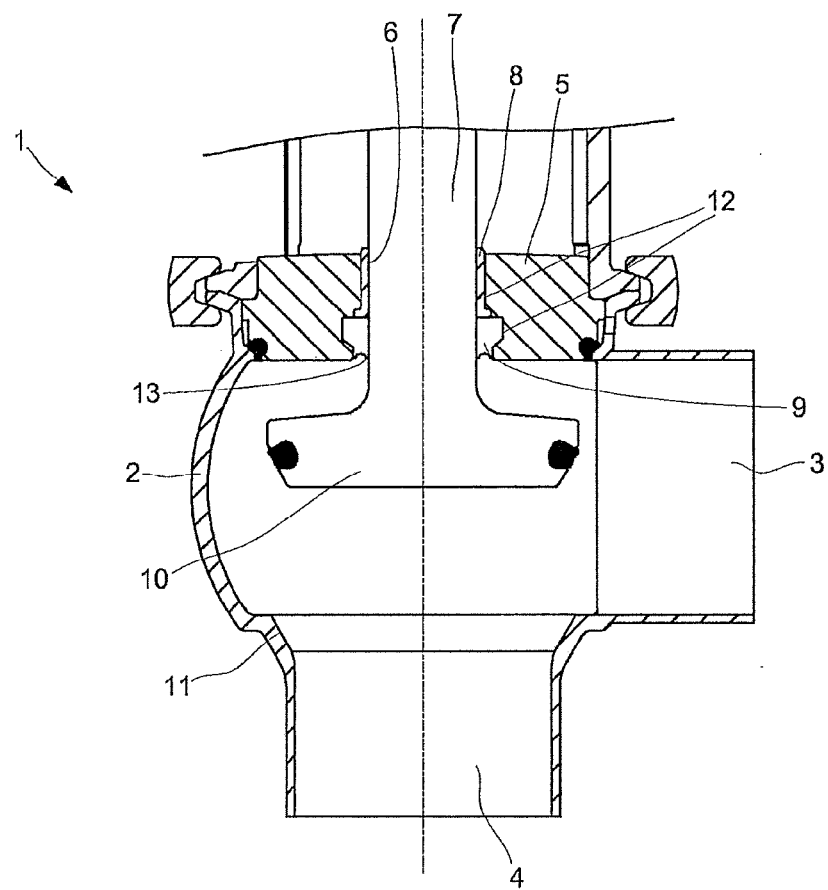

| | | | | |
|---|---|---|---|---|
| 3,627,260 | A | * | 12/1971 | Grove ........................... 251/214 |
| 3,633,873 | A | * | 1/1972 | Leopold et al. ............... 251/326 |
| 4,630,629 | A | | 12/1986 | Nimberger |
| 5,678,803 | A | | 10/1997 | Shinohara et al. |
| 5,924,672 | A | * | 7/1999 | Crochet et al. ............... 251/63.6 |
| 6,478,043 | B2 | | 11/2002 | Ishigaki |
| 7,405,818 | B2 | * | 7/2008 | Heinzen ........................ 356/246 |
| 2001/0047826 | A1 | | 12/2001 | Ishigaki |
| 2006/0097015 | A1 | * | 5/2006 | Riney ........................... 222/559 |
| 2010/0224816 | A1 | * | 9/2010 | Ohlson et al. ................ 251/326 |

FOREIGN PATENT DOCUMENTS

| | | |
|---|---|---|
| CN | 101713463 A | 5/2010 |
| DE | 1 182 490 B | 11/1964 |
| DE | 2 230 871 A1 | 12/1972 |
| EP | 0 756 117 A1 | 1/1997 |
| WO | WO 2009/049705 A1 | 4/2009 |
| WO | WO 2009/071217 A1 | 6/2009 |

OTHER PUBLICATIONS

International Search Report (PCT/ISA/210) issued on Oct. 14, 2011, by the European Patent Office as the International Searching Authority for International Application No. PCT/EP2011/059958.

Written Opinion (PCT/ISA/237) issued on Oct. 14, 2011, by the European Patent Office as the International Searching Authority for International Application No. PCT/EP2011/059958.

* cited by examiner

-- PRIOR ART --

VALVE WITH A VALVE BONNET

CROSS-REFERENCE TO RELATED APPLICATIONS

The invention is related to Danish patent application no. PA 2010 70264, filed Jun. 15, 2010, which is incorporated herein by reference.

TECHNICAL FIELD

The invention relates to a valve comprising a valve housing with a valve bonnet, an inlet opening and an outlet opening, said valve bonnet having a passage for a valve stem, said passage has a sidewall and said valve stem being connected to a valve disk for closing said valve when in contact with a valve seat in said valve housing, said valve stem further being connected to an actuator, where said actuator is placed outside the valve housing, where the passage in said valve bonnet has at least a first section with a first cross sectional area, and at least a second narrow section with a second cross sectional area, where said second cross sectional area is smaller than said first sectional area.

BACKGROUND

In the industry it is common to use valves to control and to regulate flows of e.g. liquids. Such valves can for instance be used in dairy plants where there is a large need for controlling different liquids such as milk in different processes or cleaning agents for cleaning the valves, pipes in the system and for cleaning tanks.

Such a valve can be used to secure a closed connection between two separate pipe systems, between a tank and a pipe system or the like.

When used in dairy plants or other places where for instance foodstuffs are prepared and/or handled there is a high demand for a hygienic solution. During use of the valves the product e.g. milk will enter into small crevices between gaskets and structural parts such as a valve seat, bushings in the valve bonnet and so on, and deposit there. During a cleaning sequence this product has to be cleaned away and any bacteria left in these critical places has to be removed to obtain a clean and bacteria free environment.

When a valve consists of several stainless steel parts with gaskets and bushings, a satisfying cleaning result can be quite a challenge.

It is common to use stainless steel in such valves and valve parts due to the robustness regarding corrosion, but the different steel parts have to be held at a small distance to avoid seizing as this tends to happen when stainless steel components slide upon each other. By using bushings of e.g. a low friction polymer or rubber this can be avoided, but then there will be a number of services between the different parts, which can be difficult to clean sufficiently.

Additionally, there is a need to use gaskets or sealing lips to secure the needed tightness of the valve. Also the area between such sealing lips and the actual structural part is difficult to clean.

From WO 2009/071217 A1 a solution for obtaining a valve with a valve plug, where the parts are easy to clean, as there are no gaskets or sealing in any grooves or the like in the area of the valve plug and the valve seat.

SUMMARY

An object of the invention is to provide a valve comprising fewer parts than known from prior art valves, where the valve has a need for a minimum of maintenance and where service is easy to carry out, when needed, and where cleaning is simple and consequently the valve will be more hygienic.

The invention thus concerns a valve comprising a valve housing with a valve bonnet having a passage for a valve stem, and the passage in said valve bonnet has a sidewall with at least a first section with a first cross sectional area, and at least a second narrow section with a second cross sectional area, where said second cross sectional area is smaller than said first sectional area. The valve has a passage in the bonnet where the sidewall in said passage, at least in a second section has a second cross sectional area, where said sidewall is in direct contact with said valve stem.

This way the stem is sealing itself against the sidewall in said second section, where the cross sectional area is smaller than the diameter of the stem. Thus, there is no need for additional sealing or gaskets between the valve bonnet and the valve stem, and therefore there are no crevices, which are difficult to clean. Compared to the known prior art solutions, a number of guiding bushings, gaskets and sealing are unnecessary and at the same time a smaller number of components are used. These details in combination give,s a solution that is easier to maintain as only a small number of different parts are needed, and at the same time this solution is more hygienic and easier to clean.

In an embodiment of the valve said passage in said valve bonnet has two narrow sections where the cross sectional area in the at least two second narrow sections is smaller than the cross sectional area in the at least one first section. The stem in such a passage will then be in contact with the sidewall in the passage at two different locations and a more stable and secure sealing between the stem and the valve bonnet will take place.

In another embodiment the valve has a valve bonnet, where said valve bonnet in the area of the passage comprises a material, where said material has a higher modulus of elasticity than the material of the valve stem. Thus the valve stem has a lower modulus of elasticity and will be elastic deformed when operated thru the passage, and thereby creating the sealing effect between the stem and the valve bonnet.

In another embodiment the valve stem can have a core with a first modulus of elasticity and a cover with a second and lower modulus of elasticity. Thus, it is possible to have a valve stem with a first stiffness in e.g. the lengthwise direction and a second stiffness in another direction.

In another embodiment the valve stem has a nominal outer cross sectional area or outer diameter, where this area or diameter is smaller than or substantially equal to the area or diameter of the passage in a first section with a first cross sectional area/diameter and is larger than the passage in a second section with a second cross sectional area/diameter.

The valve may have an internal ring shaped volume created and surrounded by one first section, two second sections and the valve stem, where this internal ring shaped volume contains a lubricant. The volume can e.g. contain a lubricant which is especially approved for lubricating moving parts in connection with preparing or processing foodstuffs.

In another embodiment the bonnet can be with a passage for a valve stem, where a further small passage is extending from said internal ring shaped volume and to an outside face of said valve bonnet. Thereby it is possible to supply an additional lubricant to the ring shaped volume as mentioned above. This lubricant can be supplied from a supply chamber via a direct supply line or via a manual and transportable supply. Further this said small passage can be used during servicing and cleaning to secure that also the ring shaped volume is cleaned.

Further, the valve may be manufactured in such a way that at least a part of the surface of the valve stem and/or at least a part of the surface in the passage comprises an indicator material such as a magnetic material, colour pigments, or barium sulphate. During use of the valve wear will occur and some of the material from either the valve bonnet or from the valve stem will eventually end up in the product. By having some of the parts in question made with build in indicator means, these indicator means will become visible in the product by means of particles with a contrast color, magnetic particles detected by magnetic means or by x-ray equipment detecting e.g. barium sulphate.

The valve bonnet may be made of stainless steel with or without a polymer coating, or other types of low friction coatings e.g. PVD, or it can be made completely from a suitably polymer mixture.

When designing the shape of the passage the cross sectional area of the passage and the cross sectional area of the valve stem may have a predetermined ratio. The different cross sectional area in the passage can e.g. be with a slope with a predetermined angle, where the angle is designed for the modulus of elasticity of the valve stem and of the valve bonnet respectively.

An optimal deformation of the elastic material may be found in relation to fatigue, the obtainable leakage pressure, friction and wear, and also the hygiene. Too high deformation will seal very tight but at the same time it will stress the material in a way that fatigue may become an issue. Also the friction and consequently wear will increase if the deformation is too large. On the other hand, if the deformation is too small, tightness may become an issue as well as the hygiene.

The valve has been tested and wear tests have exceeded 160.000 activations tested towards a 7 bar product pressure (water) without any leakage at all and without any significant wear. Further the tightness between the valve stem and valve bonnet has been tested at 25 bars without any leakage. Further the valve has been tested for cleanability of the new sealing principle. This has been done by using the EHEDG-test (European Hygienic Engineering & Design Group-test) for in-place cleanability as described in EHEDG guideline no 2. The test was done three times in a row by the Danish Technological Institute. All tests came out with a positive result.

For the described valve there is no need for the prior polymer bushing and elastomer seal, and the new hygienic sealing principle reduces or even eliminates the problems with respect to the cleanability of the lip seal as the lip seal is gone. Further, the valve reduces the need for maintenance significantly and eliminates the need for some spare parts as only the valve bonnet and the valve stem are present.

DRAWINGS

Figure 2:
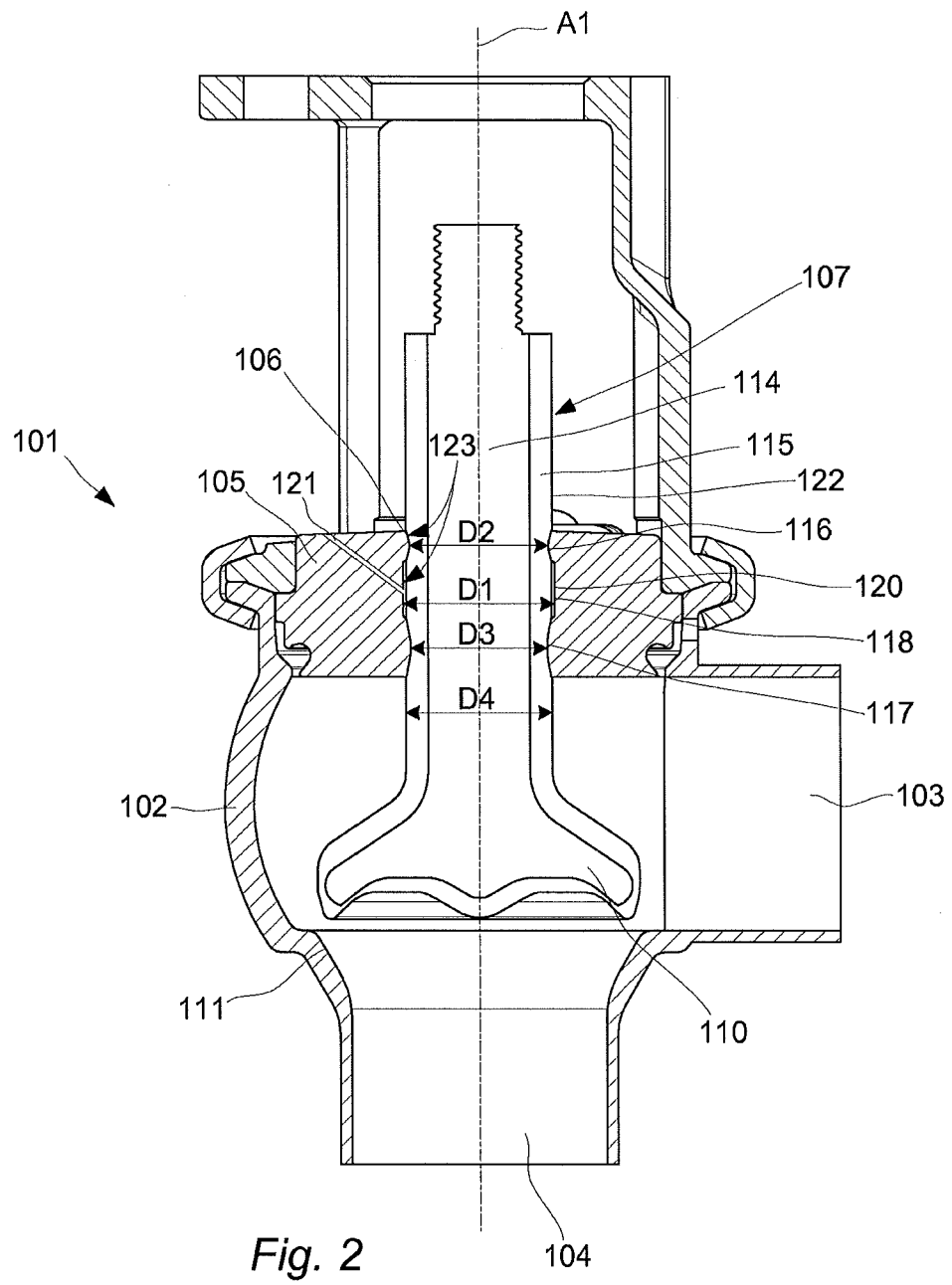
Figure 3:
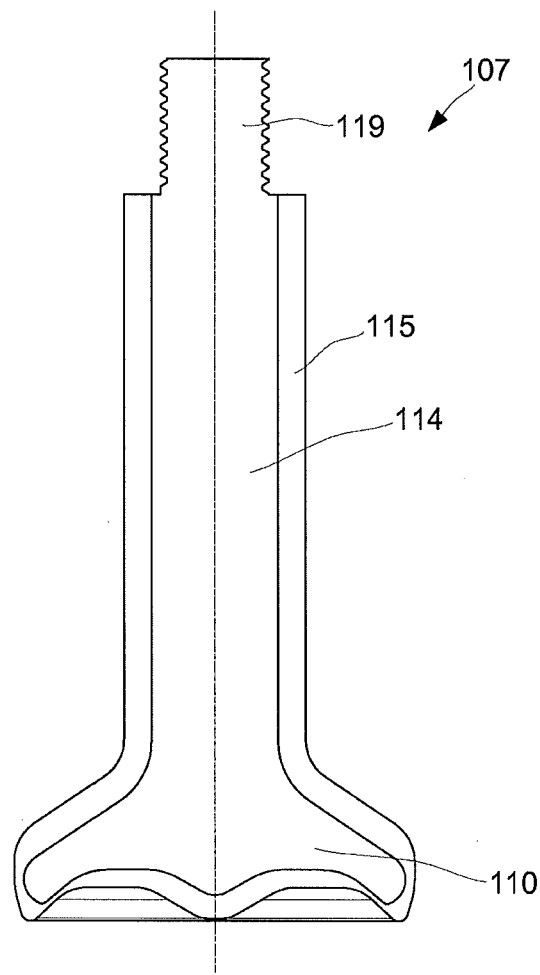
Figure 4:
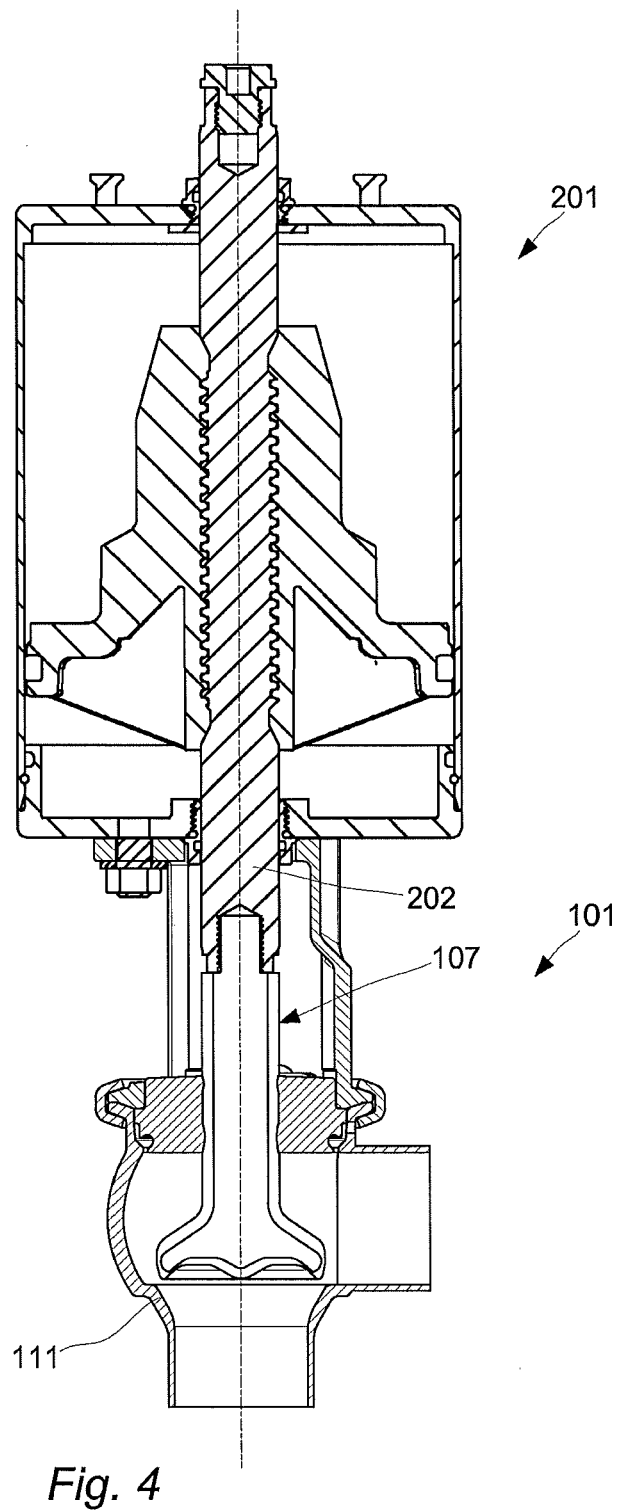

Embodiments of the invention will now be described, by way of example, with reference to the accompanying schematic drawings, where FIG. 1 shows a valve according to the prior art,
FIG. 2 shows a valve according to the invention,
FIG. 3 shows a valve stem, and
FIG. 4 shows the valve of FIG. 2 in combination with a piston arrangement.

DETAILED DESCRIPTION

With reference to FIG. 1 a valve 1 according to the prior art is shown. The valve 1 comprises a valve housing 2 with an inlet opening 3 and an outlet opening 4. The valve housing 2 has a valve bonnet 5 with a passage 6 for a valve stem 7. In said passage 6 there is a bushing 8 and a lip seal 9 to prevent seizing and to secure a proper sealing between the valve bonnet 5 and the valve stem 7. The valve stem 7 further comprises a valve disc 10, which in a lower position will come into contact with a valve seat 11 above the outlet opening 4. The mentioned bushing 8 and the lip seal 9 are arranged in fixed in cut outs 12 in the passage 6. Between the lip seal 9 and the passage 6 there is a crevice 13 where a small amount of the product can enter during use of the valve 1 and thus give an unwanted presence of bacteria growth. The crevice 13 is narrow but it is practically not possible to avoid a small penetration of a fluid/product that flows from the inlet opening 3 to the outlet opening 4. Moreover, as the crevice 13 is narrow efficient cleaning is very difficult.

With reference to FIG. 2 a valve 101 according to the invention is shown. The overall construction of the valve 101 is similar to the valve 1 of FIG. 1. The valve 101 comprises a valve housing 102, an inlet opening 103, an outlet opening 104, a valve bonnet 105 with a passage 106 and a valve stem 107. The valve stem 107 comprises a valve disc 110, which in a lower position will come into contact with a valve seat 111 above the outlet opening 104. The valve stem 107 may be seen as connected to the valve disk 110 or vice versa, which comprises that the valve stem and 107 valve disk 110 may be "formed as an integral unit".

The valve stem 107 has a core 114 with a first modulus of elasticity and an outer cover 115 with a second modulus of elasticity. In the valve bonnet 105 there is quite a difference compared to the valve bonnet 5 of FIG. 1 as the surface in the passage 106 has a diameter in the passage 106 that varies as there is a first ring shaped protrusion 116, a second ring shaped protrusion 117 and between the protrusions 116 and 117 there is created a ring shaped volume 118. The ring shaped volume 118 can be filled with a lubricant via a small, further passage 121 that extends from said volume 118 to e.g. the top side of the valve bonnet 105. The further passage 121 may be sealed by e.g. a plug (not shown) that is inserted in the further passage 121 at the top side of the valve bonnet 105, such that leakage of the lubricant is prevented.

The protrusions 116 and 117 have different extensions in the lengthwise direction of the passage 106 and also different slopes. When the valve stem 107 is moved up and down (in a direction parallel with a main axis A1 of the valve stem 107) in order to open or close the valve 101, the outer cover 115 of the valve stem 107 is temporarily deformed as the valve stem 107 passes the protrusions 116 and 117 respectively. Thus, the sealing between the valve bonnet 105 and the valve stem 107 is constituted only by the protrusions 116 and 117 and by the outer cover 115 of the valve stem 107. During service, the only part to change as a consequence of wear is the valve stem 107.

The valve 101 has no extra parts arranged in cut outs in the valve bonnet 105 and thus there is no additional, narrow crevice where bacteria can grow.

From above follows that the passage 106 has a sidewall 123 and the sidewall 123 in the passage 106 is in direct contact with the valve stem 107 at the protrusions 116, 117. Also, it may be said that the passage has a first section 120 with a first cross sectional area and a second section with a second cross sectional area that is smaller than the first cross sectional area. Then the first section 120 defines a peripheral boundary of the ring shaped volume 118 and the second section corresponds to the protrusion 116. Similarly, it may be said that the passage 106 comprises a third section with a third cross sectional area that is smaller than the first cross sectional area of the first section 120. The third section then corresponds to the protrusion 117.

In other words, the second section 116 is here formed as a protrusion that extends into the passage 106 for the valve stem 107. As shown, the second section 116 abuts a circumferential surface 122 of the valve stem 107. The same applies for the third section 117. The sidewall 123 in the passage 106 is in direct contact with the valve stem 107 at the second section 116 with the second cross sectional area, such that a seal is provided between the valve stem 107 and the valve bonnet 105.

In the illustrated embodiment the valve stem 107 and the passage has circular cross sections, and the first cross sectional area is then defined by the diameter D1 at the first section 120 (first cross sectional area=$\pi \cdot (D1/2)^2$). Correspondingly, the second cross sectional area is defined by the diameter D2 at the second section 116 and the third cross sectional area is defined by the diameter D3 at the third section 117. The diameter of the valve stem 107 is D4 and its cross sectional area is defined by D4.

Both D2 and D3 are smaller than D4. Also, D2 and D3 are smaller than D1. This means that the valve stem 107 is compressed at points of contact with the third and second sections 116, 117. However, the valve stem 107 is made of a flexible material that regains its shape when not in contact with the sections 116, 117. However, some part of the valve stem 107 is, during operation of the valve 101, always in contact with the sections 116, 117 such that a seal is obtained at the points of contact, i.e. where the valve stem 107 is currently compressed. In this context, the nominal diameter of the valve stem 107 is its diameter at sections where it is not compressed by the protrusions 116, 117. At sections (points of contact) compressed by the protrusions 166, 117 a tight seal is obtained, and a diameter of the valve stem 107 at the points of contact is in principle the same as D2 respectively D3.

As may be seen, in the illustrated embodiment the second section 116 is integral with the valve bonnet 105, i.e. the second section 116 and the valve bonnet 105 form a unitary member. The third section is also a part of this unitary member.

It is possible to implement only one of the second 116 and third section 117. An efficient seal will still be obtained, but the lubricant-filled, ring shaped volume 118 is been lost.

With reference to FIGS. 3 and 4 the valve stem 107 used for the inventive valve 101 is shown in its total where the core 114 at the top end has a thread end 119 for engagement with an actuator 202 or a connection member between the valve stem 107 and the actuator 202. The valve stem 107 is connected to an actuator 202 and the actuator 202 may be part of e.g. a pressure controlled piston arrangement 201 that may move the actuator 202 and hence the valve stem 107 up and down in relation the valve seat 111. The valve 101 and its valve stem 107 may be connected to other types of actuators or actuator controlling arrangements, such as electrically controlled or manually handled arrangements. As shown, the actuator 202 is placed outside the valve housing 202.

The valve stem 107 is covered with the outer cover 115, which can be with different mechanical or chemical properties at different areas. It is thus possible to have one set of material properties at the valve stem 107 in the area for moving through the valve bonnet 105 and another set of material properties at the valve disc 110.

Both the outer cover 115 and the core 114 of the valve stem 107 may be made of plastic materials. The outer cover 115 may then be made of a material that is more flexible than the core 114. A relatively stiff valve stem 107 is then obtained while the surface sections that abuts the protrusions 116, 117 may still be compressed such that a tight seal between the valve stem 107 and that valve bonnet 105 is provided. The plastic materials may be fused to each other, such that the outer cover 115 is bonded to the core 114. The outer cover 115 and the core 114 may of course be bonded to each other by employing other suitable techniques.

An example of a material for the core 114 is reinforced polypropylene. An example of a material for the outer cover 115 is plastic formed by thermoplastic elastomeric compounds. This includes e.g. styrene block copolymers, hydrogenated or non hydrogenated, or alloys of these and other compatible polymers. Various thermoplastics, process oils, fillers and stabilizers may be included for obtaining suitable properties in respect of heat resistance, chemical resistance, mechanical resistance etc. Not only plastic materials may be used, but also metallic materials, typically for the core 114 but also for the outer cover 115.

The valve bonnet is typically made of stainless steel with or without a polymer coating or other types of low friction coatings such as PVD (polyvinylidene), or it can be made completely from a suitably polymer mixture.

In any case, the valve stem 107 comprises an outer, flexible material, such that the second section 116 causes the valve stem 107 to flex in a direction that is transverse a direction of movement of the valve stem 107. The direction of movement is, as indicated, the direction that is parallel with the main axis Al of the valve stem 107. The flexing of the valve stem 107 is local, i.e. the outer cover 115 is locally and elastically deformed when the valve stem 107 is moved over the protrusions 116 and 117. When the section of the valve stem 107 that is deformed by the protrusions 116, 117 is moved away from the protrusions 116, 117, the formerly deformed section regains its shape.

The invention is not limited to the embodiments described above and shown on the drawings, but can be supplemented and modified in any manner within the scope of the invention as defined by the enclosed claims. For example, the valve stem 107 and the passage 106 must not have circular cross sections.

The invention claimed is:

1. A valve comprising
a valve housing with a valve bonnet,
an inlet opening and an outlet opening, the valve bonnet having a passage for a valve stem, the passage having a sidewall and the valve stem comprising a valve disk for closing the valve by bringing the valve disk in contact with a valve seat in the valve housing, the passage in the valve bonnet comprising at least a first section with a first cross sectional area and a second section with a second cross sectional area that is smaller than the first cross sectional area,
wherein the sidewall in the passage is in direct contact with the valve stem at the second section with the second cross sectional area, the valve stem has a nominal outer cross sectional area or an outer diameter that is larger than the second cross sectional area or a diameter of the passage at the second section, and the valve stem comprises an outer, flexible material such that, when the valve stem moves past the second section, the second section causes the valve stem to flex in a direction that is transverse a direction of movement of the valve stem.

2. A valve according to claim 1, wherein the passage in the valve bonnet comprises a third section with a third cross sectional area that is smaller than the first cross sectional area of the first section.

3. A valve according to claim 1, wherein the valve bonnet comprises a material that has a higher modulus of elasticity than a material of the valve stem.

4. A valve according to claim 1, wherein the valve stem comprises
a core with a first modulus of elasticity and
a cover with a second modulus of elasticity that is lower than the first modulus of elasticity.

5. A valve according to claim 4, wherein the outer cover is bonded to the core.

6. A valve according to claim 4, wherein the outer cover and the core are made of plastic materials.

7. A valve according to claim 1, wherein the valve stem has a nominal outer cross sectional area or an outer diameter that is smaller than or substantially equal to the first cross sectional area or to a diameter of the passage at the first section.

8. A valve according to claim 2, wherein an internal ring shaped volume created and surrounded by the first section, the second section, the third section and the valve stem contains a lubricant.

9. A valve according to claim 8, wherein the bonnet with the passage for the valve stem comprises a further passage that extends from the internal ring shaped volume to an outside face of the valve bonnet.

10. A valve according to claim 1, wherein a surface of the valve stem and/or a surface in the passage comprises an indicator material such as a magnetic material, colour pigments, or barium sulphate.

11. A valve according to claim 1, wherein the second section is formed as a protrusion that extends into the passage for the valve stem, such that the second section abuts a circumferential surface of the valve stem.

12. A valve according to claim 1, wherein the second section is integral with the valve bonnet.

* * * * *